Sept. 16, 1941.  C. O. JOHNSTON  2,256,286
THERAPEUTIC DEVICE
Filed July 19, 1938
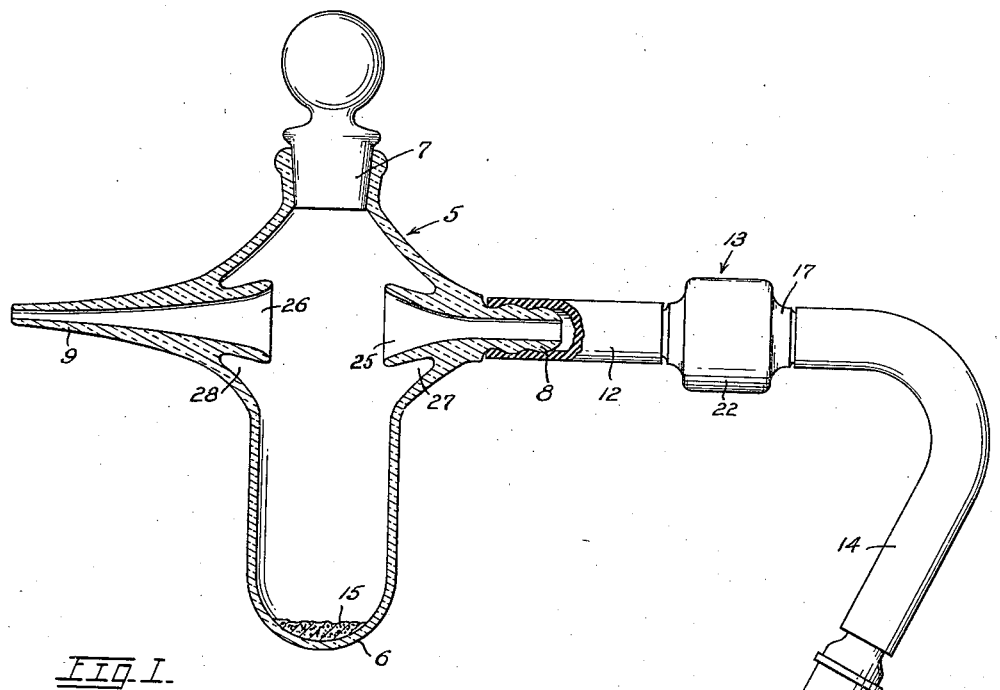
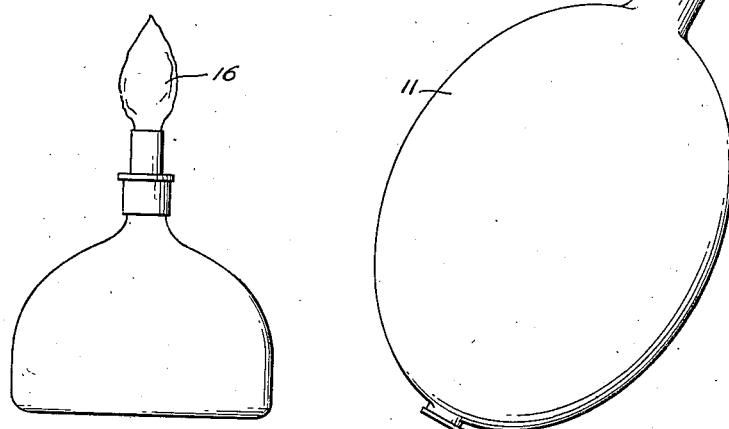
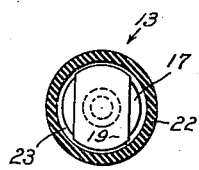
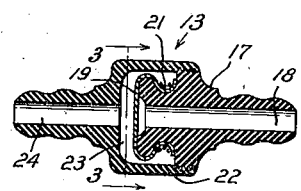
Inventor;
Charles O. Johnston,
per Arthur J. Farnsworth
Attorney.

Patented Sept. 16, 1941

2,256,286

UNITED STATES PATENT OFFICE 2,256,286

THERAPEUTIC DEVICE

Charles O. Johnston, Venice, Calif.

Application July 19, 1938, Serial No. 220,049

1 Claim. (Cl. 128—192)

My invention relates to methods and means for superficial application of certain kinds of medicaments, and among its more important objects are; first, to provide an improved practical method whereby iodine, or substances of like character, may be sublimed for therapeutic purposes, directly upon surfaces of the body; and, second, to furnish simple, efficient, and inexpensive means for accomplishing such treatments.

It is well understood that sublimation is one of the best of the known methods of chemical purification, and that substances like iodine may readily be purified in this manner. It is quite practical to sublime iodine directly upon living tissues; and, when thus applied, the sublimate possesses truly remarkable and unexpected medicinal properties. Such characteristics are believed to be due to several things, including the almost absolute purity of the sublimate, especially when it has previously been sublimed or re-sublimed; a seemingly nascent quality of the sublimate, which gives it great chemical activity, and a special capacity for destroying certain organisms such as pus germs; an ability of the sublimate to quickly penetrate the most minute pores and crevices of the body, and to thus come into very intimate contact with the tissues to be treated; and the fact that the sublimate is not associated with any tissue irritant, such as alcohol or the other solvents which have been used heretofore.

When iodine in nascent form, or possessing quasi-nascent qualities, comes into contact with most body tissues, it will be absorbed with astonishing rapidity, and penetrate to great depths. Such iodine will very quickly unite with many salts within the body, including those that tend to cause pain; and it will form potassium iodine, which is an alterative. I have observed repeatedly that, whether or not iodine which has been sublimed directly upon body tissues is truly nascent in the ordinarily accepted sense, it acts as if fully possessed of this quality in its accomplishment of the functions just described. Such treatment therefore affords means for quickly deodorizing pussy and ill-smelling surfaces; a method for almost instantly sterilizing living tissues, without irritation thereof; and a remarkable stimulant to normal tissue repair. When it is used; fresh uninfected wounds will remain sterile, and prompt healing should occur; infected wounds will almost immediately become sterile, both on the surface and in the deeper tissues, because of the rapid absorption and penetration of the iodine; and initial preparation, or even manipulation of the tissues to be treated, usually is unnecessary.

For the reasons set forth, the herein disclosed method and means is adapted for treating all external, and many internal parts of the body; and it will be found to be especially useful in emergency situations, such as those which arise in warfare and in the case of accident.

To enable this therapeutic method to be employed to the best advantage, I have provided simple and convenient apparatus, of which a preferred embodiment is illustrated in the accompanying drawing. Of these illustrations—

Figure 1 is a side elevation of my complete improved equipment, some of the parts being shown in central section for convenience;

Figure 2 is a central longitudinal section of certain portions of the apparatus illustrated in Fig. 1; and Figure 3 is a cross-section of the construction of Fig. 2, taken on the plane indicated by broken line 3—3.

Similar reference numerals refer to similar things, throughout the several figures of the drawing.

The form of apparatus illustrated, comprises a vaporizing vessel which is indicated generally at 5. This should be made of silex, or of other suitable inert material which is capable of withstanding temperatures slightly above the vaporizing temperature of the medicament to be employed. This vessel preferably has a hemispherical bottom 6; and a filling orifice which normally is closed by means of an accurately fitted stopper 7, of a similar inert material. It also is provided with a pressure-inlet nozzle 8, and with a discharge spout 9. The inlet nozzle is connected to an ordinary rubber hand pressure bulb 11 by means of an interposed rubber connector 12, a small check valve indicated generally at 13, and a short length of rubber tubing 14.

When iodine is to be administered in the manner described, a small quantity of this substance, preferably in previously sublimed or re-sublimed form, is placed at the bottom of vessel 5, as at 15. The vessel is then held over a small flame 16, until iodine vapor fills the entire space within the vessel above the solid 15. Spout 9 is then directed at, and held in fairly close proximity to, the body surface to be treated, and bulb 11 is suddenly compressed. This will cause iodine vapor to shoot out of spout 9, against the tissues under treatment, and to be sublimed thereupon.

The simple check valve indicated generally by arrow 13, is for the purpose of preventing the vaporized medicament from being drawn back into tube 14 or bulb 11, as when pressure upon the latter is released. Without it, the vapor might sublime within the tube or bulb, and this would be undesirable. The form of check valve illustrated (see Figs. 2 and 3) includes an element 17, of which the right hand extremity is a nipple adapted for being inserted in the end of tube 14. This element has an axial bore 18 therethrough; and the left hand end of this bore is normally closed by means of a thin flat rubber band 19, under slight tension. This band may be conveniently held in place by means of a small elastic or thread winding, as at 21. Another element 22, of the general shape illustrated, is screwed upon element 17, and affords a chamber 23 which encloses band 19. Element 22 also has an axial bore, designated 24, and is provided with a left hand extremity adapted for insertion into rubber connector 12. Obviously, a compression of bulb 11 will cause band 19 to deflect, and thus allow compressed air to pass into vessel 5. The band will prevent a reverse flow however, by seating itself upon the left hand extremity of element 17. The left hand end of bore 18 preferably is slightly expanded, to afford a greater surface of the rubber band for the bulb pressure to re-act against. All parts of the check valve body should be made of inert material, such as vulcanite or Bakelite.

As illustrated in Fig. 1, it is desirable to have the bores of inlet nozzle 8, and discharge spout 9, flare inwardly to several times the respective outer end diameters. This is for the purposes; of gradually and greatly reducing the velocity of the incoming air from the pressure bulb; and for gradually and greatly increasing the velocity of the stream of vaporized medicament issuing through the discharge spout. In this manner it is easy to avoid undue turbulence within vessel 5, without sacrificing the desired jet velocity at spout 9.

Inner end 25 of the inlet nozzle, is considerably spaced from inner end 26 of the discharge spout; to prevent air from flowing directly across from the former to the latter unless it picks up and carries vaporized medicament with it. In the construction illustrated, air will enter vessel 5 at 25, at low velocity; and it will gently push vaporized medicament ahead of it into the enlarged end 26 of the discharge spout. The velocity of the vapor-laden stream will then quickly be built up, to the value desired in the emerging jet.

I prefer to provide relatively deep co-axial annular recesses around the inner ends of both the inlet nozzle and the discharge spout, as at 27 and 28 respectively. This is for the purpose of affording effective sumps for preventing any escape of either liquid or solid medicament. Otherwise such escape might be possible, if the apparatus should be handled carelessly. When these sumps are provided, and only a small quantity of medicament is used, vessel 5 may be held in any position, and be manipulated as desired, without danger of spilling any of its liquid or solid contents.

It will be apparent that the described apparatus may be used with many forms of auxiliary equipment; such as extension tubing cooperating with discharge spout 9. In such ways it is possible to utilize the disclosed method for treating otherwise inaccessible and concealed surfaces, with a minimum of disturbance and inconvenience.

Obviously, also, it is entirely feasible to employ any suitable source of compressed air in place of bulb 11, if a shut-off valve is substituted for check-valve 13. Such substituted shut-off valve could be worked either by hand or foot, as desired; and, with the latter arrangement, both hands of the operator can be left free for manipulating the device, any auxiliary devices which are to be employed, and the tissues to be treated.

Having thus fully disclosed my invention, I claim:

An apparatus for treating diseased or injured parts of the body with vaporized medicament comprising a body portion of inert material having a closed bottom wall and a filling opening in the upper wall normally closed by a detachable cover, the heighth of said body portion being greater than the width between the side walls thereof to provide an elongated column of vapors within said body portion, integrally formed inlet and outlet passages provided in opposite side walls of said body portion, said inlet passage having means exterior to the body portion for connection to a source of fluid under pressure and the walls of said inlet passage extending into said body portion beyond the side wall thereof to provide a trap for the solid contents in said body portion, the walls of said inlet passage being flared in such manner as to increase the cross-sectional area of said passage toward the inlet end thereof and thereby reduce the pressure of fluid admitted to said body portion, and the outlet passage having flared walls extending into said body portion beyond a side wall thereof to provide a trap for the solid contents in said body portion, the inner end of said outlet passage being transversely aligned with the inner end of said inlet passage but spaced transversely therefrom to permit the medicament to pass freely from the filling opening to the bottom of the body portion, said outlet passage being reduced in cross-sectional area from the inner flared end toward the discharge end thereof whereby the pressure of the fluid and vapors ejected will be increased.

CHARLES O. JOHNSTON.